United States Patent
Itzel et al.

(10) Patent No.: US 7,163,376 B2
(45) Date of Patent: Jan. 16, 2007

(54) CONTROLLED LEAKAGE PIN AND VIBRATION DAMPER FOR ACTIVE COOLING AND PURGE OF BUCKET SLASH FACES

(75) Inventors: Gary Michael Itzel, Simpsonville, SC (US); Ariel Caesar-Prepena Jacala, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 10/995,342

(22) Filed: Nov. 24, 2004

(65) Prior Publication Data

US 2006/0110255 A1    May 25, 2006

(51) Int. Cl.
*F01D 11/00* (2006.01)
(52) U.S. Cl. .................................. 416/193 A
(58) Field of Classification Search ........... 415/115, 415/119; 416/97 R, 193 A, 500
See application file for complete search history.

(56) References Cited

U.S. PATENT DOCUMENTS 4,088,421 A * 5/1978 Hoeft ..................... 416/193 A
4,917,574 A * 4/1990 Dodd et al. .............. 416/193 A
5,531,457 A * 7/1996 Tibbott et al. ............... 277/590
6,776,583 B1   8/2004 Wang et al.
7,021,898 B1 * 4/2006 Elliott et al. ............. 416/193 A

* cited by examiner

Primary Examiner—Edward K. Look
Assistant Examiner—Devin Hanan
(74) Attorney, Agent, or Firm—Nixon & Vanderhye P.C.

(57) ABSTRACT

Damper pins are disposed in circumferentially registering grooves of turbine bucket platform slash faces. The pins have a plurality of channels formed about peripheral portions thereof for flowing leakage cooling air from below the platform past the pin and groove into the interplatform gap. The channels may be staggered in an axial direction. By flowing cooling air through the channels, the slash faces are convectively cooled, opposite slash faces to the channels are impingement cooled and the exiting cooling air purges the gap between the slash faces adjacent the hot gas path. Alternatively, the channels may be formed in the grooved surfaces and a cylindrical damping pin may be inserted with similar cooling effects.

13 Claims, 3 Drawing Sheets

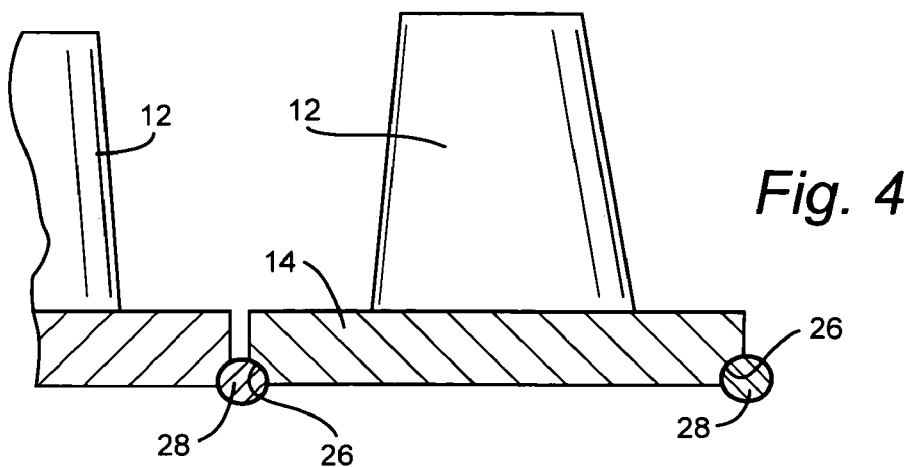
Fig. 4
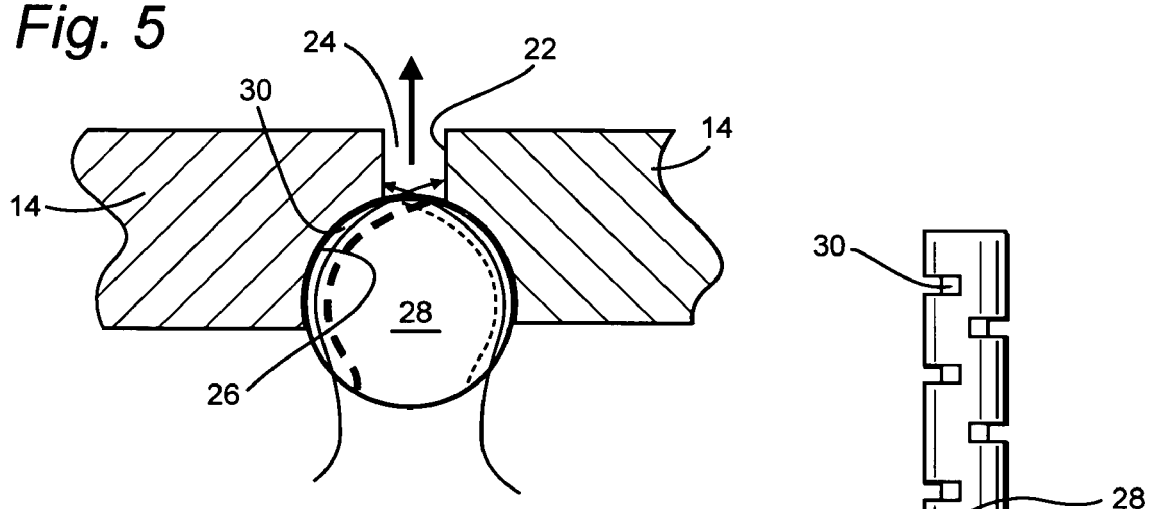
Fig. 5
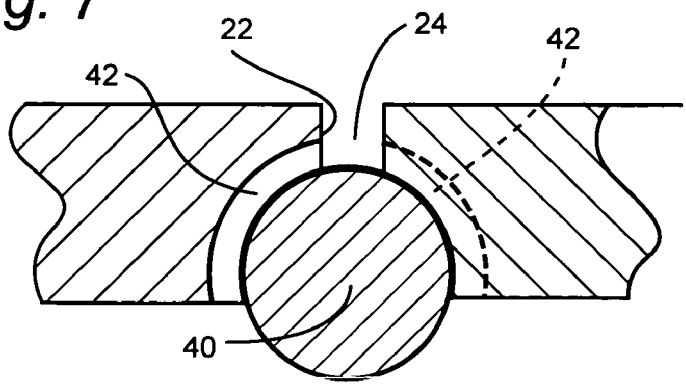
Fig. 7
Fig. 6

CONTROLLED LEAKAGE PIN AND VIBRATION DAMPER FOR ACTIVE COOLING AND PURGE OF BUCKET SLASH FACES

BACKGROUND OF THE INVENTION

The present invention relates to a pin for disposition between adjacent slash faces of turbine bucket platforms and particularly relates to a system for damping bucket vibrations and cooling the slash faces of turbine bucket platforms to temperature levels required to meet part life requirements including oxidation, creep and low cycle fatigue cracking.

Over the years gas turbines have trended towards increased inlet firing temperatures to improve output and engine efficiencies. As gas path temperatures have increased, bucket platform slash faces have increasingly exhibited distress including oxidation, creep and low cycle fatigue cracking. This effect is magnified in turbines where closed loop cooling is utilized because film cooling in upstream nozzles is significantly reduced or eliminated producing higher gas path temperatures at the bucket platforms. Distress of the bucket platform slash faces can damage the platform and cause loss of damping leading to aeromechanics failure, liberation of the platform causing damage to other turbine components, and compressor discharge flow leakage leading to reduced engine efficiency.

It will be appreciated that many prior turbine designs did not require active cooling of the platform slash faces due to lower firing temperatures and film cooling carry over from upstream nozzle side walls. Consequently there has developed a need to reduce the platform slash face temperatures to a level required to meet part life requirements particularly in view of the higher firing temperature of present day gas turbines.

SUMMARY OF THE PRESENT INVENTION

In a preferred embodiment of the present invention, there is provided a cooling apparatus for a turbine, comprising: adjacent turbine bucket platforms having opposed slash faces; and a generally cylindrical-shaped pin having a plurality of channels formed about peripheral portions of the pin at spaced axial locations therealong for communicating a cooling medium through the channels and cooling at least one of the slash faces of the adjacent turbine bucket platforms.

In a further preferred embodiment of the present invention, there is provided a turbine having a pair of circumferentially adjacent buckets having bucket platforms with slash faces in general circumferential registration with one another, each slash face including a groove in generally circumferential registration with one another below surfaces of the platforms exposed to a hot gas path of the turbine, a cooling system for cooling at least one of the slash faces comprising a generally cylindrical pin disposed in the registering grooves having a plurality of channels formed about peripheral portions of the pin at spaced axial locations therealong for communicating a cooling medium through the channels and cooling at least one of the slash faces of the adjacent turbine bucket platforms.

In another embodiment of the present invention, there is provided a cooling system for a turbine having a hot gas path comprising an annular array of turbine buckets each having an airfoil, a root and a platform with slash faces of adjacent bucket platforms in circumferential registration with one another, each slash face including a groove in generally circumferential registration with one another below surfaces of the platforms exposed to the hot gas path of the turbine, at least one of the slash faces including a plurality of axially spaced channels formed along peripheral portions of one of the grooves thereof, and a damper pin disposed along the grooves enabling a cooling medium for flow through the channels of said one groove and cooling at least one or another of the slash faces of the adjacent turbine buckets.

BRIEF DESCRIPTION OF THE DRAWINGS

FIG. 4 is a schematic illustration of the damper pins between adjoining slash faces;

FIG. 5 is an enlarged cross-sectional view illustrating channels in the damper pin for flowing cooling air to cool the slash faces and purge the interplatform gap;

FIG. 6 is a plan view of the damper pin; and

FIG. 7 is a view similar to FIG. 5 illustrating a further aspect of the present invention.

DETAILED DESCRIPTION OF THE INVENTION

Figure 1:
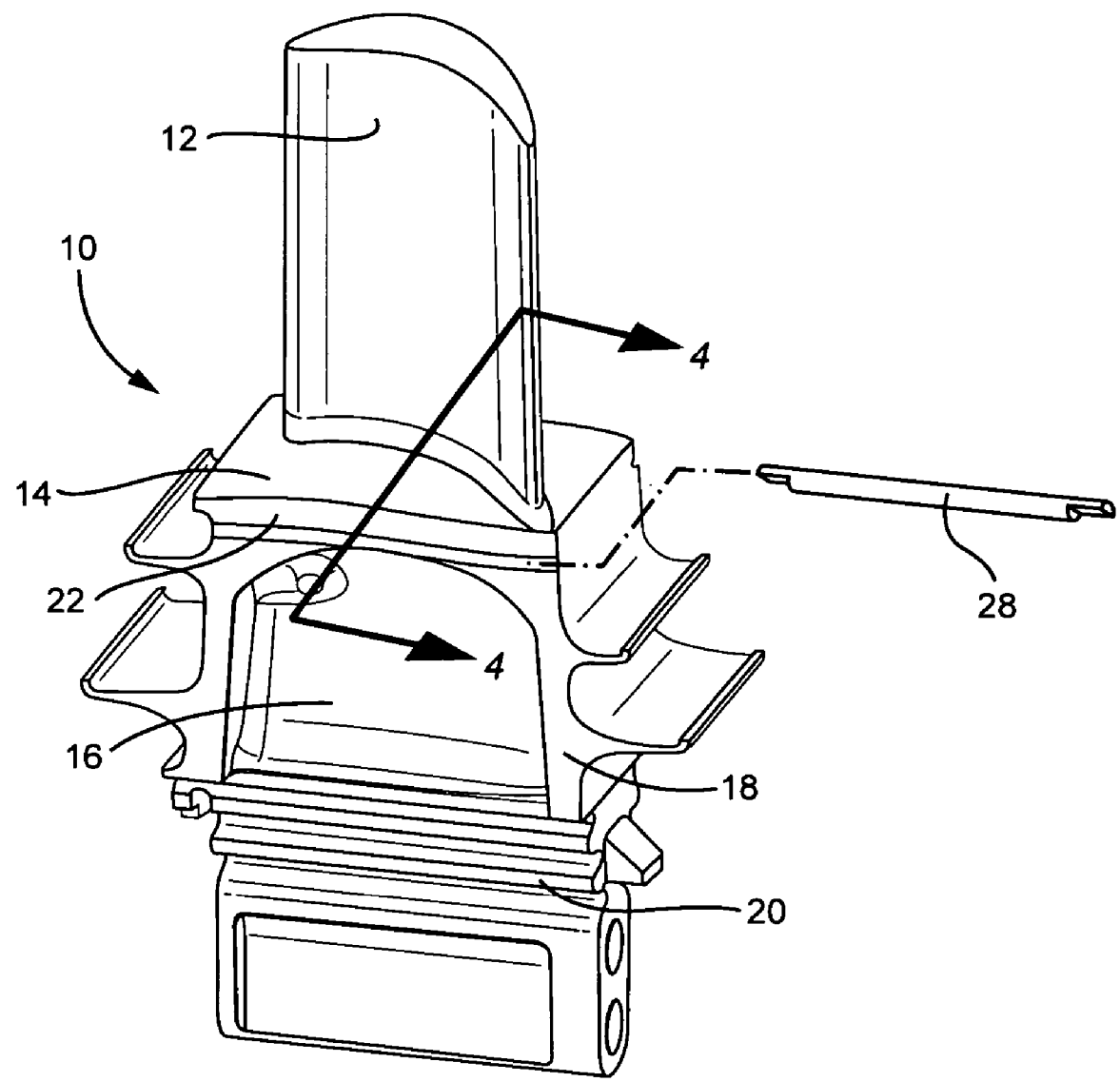
FIG. 1 is a perspective view of a bucket including the airfoil, platform and root.

Referring now to FIG. 1, there is illustrated a turbine bucket generally designated 10 including an airfoil 12, a bucket platform 14, a root portion 16 including a shank 18 and a dovetail 20. It will be appreciated that the turbine bucket 10, when placed in a turbine wheel not shown, is one of an annular array of turbine buckets secured about the periphery of the turbine wheel. While axial entry buckets are disclosed, it will be appreciated that the cooling system hereof may be applied to tangential entry buckets.

Figure 2:
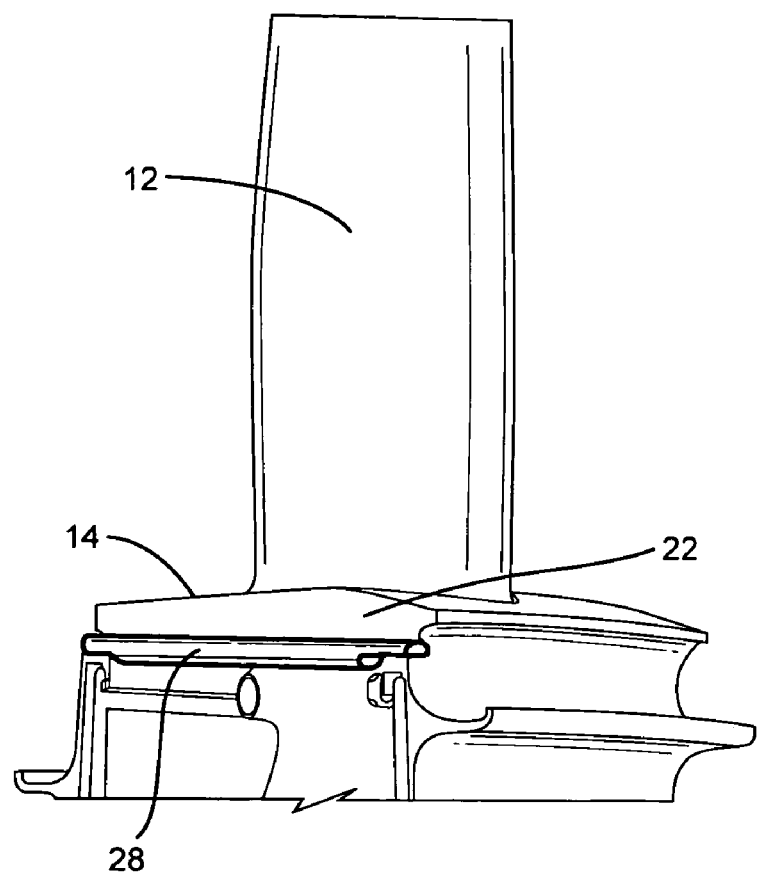
FIG. 2 is a fragmentary perspective view illustrating a damper pin along a slash face of the turbine bucket platform.
Figure 3:
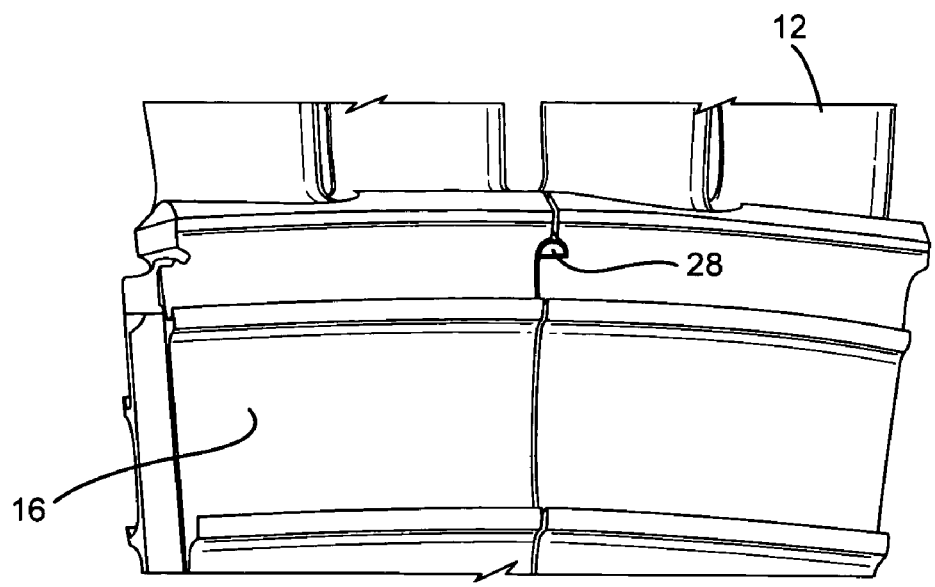
FIG. 3 is an axial end view illustrating the location of the damper pin between adjacent slash faces.

As illustrated in FIGS. 2, 3 and 5, circumferentially opposed adjacent platforms 14 include a designed gap 24 between slash faces 22. Each slash face 22 also includes a portion of a groove 26 for receiving a damper pin 28. The pin 28 serves as a vibration damper and also, in cooperation with the surfaces of the grooves of the adjacent slash faces, provides leakage paths for cooling the slash faces. It will be appreciated that compressor discharge air is provided in the region between and radially inwardly of the adjacent platforms at relatively high pressure and at a pressure higher than the pressure in the hot gas path. Damper pins, however, are typically utilized in the grooves of adjacent platforms to dampen vibration and substantially block the flow of compressor discharge through the gap 24 between adjacent platforms into the hot gas path. The present invention, however, maintains the vibration damping function of a damper pin and, in addition, provides a controlled leakage path past the damper pin for cooling the slash faces.

To accomplish this, the damper pin 28 cooperates with the surfaces of the platform defining the groove 26 to provide controlled leakage flow paths for cooling the slash faces and purging the interplatform gap 24. In one embodiment of the present invention, the damper pin 28 includes a plurality of channels 30 formed in peripheral portions of the damper pin 28 at axially spaced locations along the length of the pin. The channels 30 are also staggered relative to one another along opposite sides of the pin as illustrated in FIGS. 5 and 6. The channels 30 along opposite sides of the pin provide leakage cooling flow paths between the pin 28 and the surfaces of the groove 26. As illustrated in FIG. 2, the opposite ends of the pins have semi-cylindrical sections with flats for cooperating with corresponding flats along the slash face ends to maintain orientation in the groove 26.

The cooling effect is a combination of convective and impingement cooling. For example, the compressor discharge air from the region inwardly of the platforms flows along the channels 30 at high velocity and convectively cools the slash face in registration with the channels 30. The channels 30 are carried about the pin 28 such that each channel 30 has an exit port or angle which discharges the cooling air directly onto the opposing slash face 26. Thus the opposing slash face is impingement cooled by the jet of impingement air. It will be appreciated therefore that each slash face 26 is convectively cooled by the cooling air flow through the channels 30 along the same side as the slash face and impingement cooled by air exiting channels 30 along the opposite side of pin 28. Additionally, because the damper pin 28 is located in grooves disposed below the upper surface of the adjoining platforms, the cooling air exiting the channels 30 is used to purge or mix with the hot gas in the gap 24 between the slash faces 22 outwardly of the pin 28 thereby reducing the temperature of the air in the gap. As a consequence of this configuration of pin and grooves, the compressor discharge air is used to convectively cool and provide impingement cooling for the slash faces and provide purge air, all of which reduces the amount of cooling air required thereby maximizing engine performance and output.

In another aspect of the present invention as illustrated in FIG. 7, a solid smooth surfaced damper pin 40 can be used provided the channels 42 are formed in the surfaces forming the grooves 26 along the slash faces 22. The channels 42 may be formed at axially spaced locations one from the other along each slash face groove 26 and may be staggered relative to one another along the opposite slash face grooves. A similar cooling effect is provided with this arrangement as in the preceding arrangement i.e.; a convective cooling of the slash face surfaces 22, impingement cooling of the slash face surfaces opposite the channels 42 and finally a purge of the air in the gaps 24 between the slash faces. It will also be appreciated that in each form of the present invention, the pin serves its damping function and hence serves to perform the dual function of cooling the slash faces and dampening vibrations. The cooling of the slash faces meets the part life requirements while minimizing impact on engine performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Cooling apparatus for a turbine, comprising:
    adjacent turbine bucket platforms having opposed slash faces; and:
    a generally cylindrical-shaped pin having a plurality of channels formed about peripheral portions of the pin at spaced axial locations therealong for communicating a cooling medium through said channels and cooling at least one of the slash faces of the adjacent turbine bucket platforms, wherein said channels extend along opposite sides of said pin.

2. Apparatus according to claim 1 wherein said channels terminate short of the full periphery of the pin.

3. Apparatus according to claim 2 wherein said channels are staggered relative to one another along the length of said pin.

4. In a turbine having a pair of circumferentially adjacent buckets having bucket platforms with slash faces in general circumferential registration with one another, each said slash face including a groove in generally circumferential registration with one another below surfaces of said platforms exposed to a hot gas path of the turbines, a cooling system for cooling at least one of the slash faces comprising a generally cylindrical pin disposed in said registering grooves having a plurality of channels formed about peripheral portions of the pin at spaced axial locations therealong for communicating a cooling medium through said channels and cooling at least one of the slash faces of the adjacent turbine bucket platforms wherein surfaces of one of said grooves lie in opposition to said channels and are convectively cooled by the cooling medium flowing in the channels.

5. The system according to claim 4 wherein said channels have discharge ports for directing the cooling medium exiting the channels to impingement cool another of said slash faces.

6. The system according to claim 5 wherein said groove surfaces form part of said one slash face and said cooling channels are arranged to convectively cool said one slash face and impingement cool said another slash face.

7. The system according to claim 4 wherein said channels extend along opposite sides of said pin and terminate short of the full periphery of the pin.

8. The system according to claim 4 wherein said channels lie along opposite sides of said pin and are staggered relative to one another along the length of said pin.

9. A cooling system for a turbine having a hot gas path comprising:
    an annular array of turbine buckets each having an airfoil, a root and a platform with slash faces of adjacent bucket platforms in circumferential registration with one another,
    each said slash face including an elongated arcuate groove in generally circumferential registration with one another below surfaces of the platforms exposed to the hot gas path of the turbine, at least one of said slash faces including a plurality of axially spaced arcuate channels formed within peripheral surface portions of one of the arcuate grooves thereof, and
    a substantially cylindrical damper pin disposed along adjacent pairs of said grooves enabling a cooling medium for flow through said channels of said one groove and cooling at least one or another of the slash faces of the adjacent turbine buckets, wherein said arcuate channels and adjacent surfaces of said damper pin are substantially parallel.

10. A system according to claim 9 wherein said channels are formed in each of said grooves.

11. A system according to claim 10 wherein said channels are staggered relative to one another along the lengths of said grooves.

12. A system according to claim 11 wherein the surfaces of said channels are convectively cooled by the cooling medium.

13. Apparatus according to claim 11 wherein said channels have discharge ports for directing the cooling medium to impingement cool a slash face opposite the slash face containing said channels.

* * * * *